Nov. 30, 1954   R. H. STEARNS ET AL   2,695,709
MAGNETIC SEPARATOR
Filed Aug. 14, 1950   3 Sheets-Sheet 3

INVENTORS.
Roswell H. Stearns
Harold W. Buus
BY
Arthur P. Woolford
Attorney

United States Patent Office 2,695,709
Patented Nov. 30, 1954

2,695,709

MAGNETIC SEPARATOR

Roswell H. Stearns, Wauwatosa, and Harold W. Buus, Milwaukee, Wis., assignors, by direct and mesne assignments, to Roswell H. Stearns, Milwaukee, and Roswell N. Stearns, Fox Point, Wis.

Application August 14, 1950, Serial No. 179,258

1 Claim. (Cl. 210—1.5)

This invention relates to magnetic separators.

Objects of this invention are to provide a magnetic separator for continuously removing in an automatic manner both magnetic and non-magnetic material from coolants, such as those composed of soluble oils and water, and also such other liquids as machine oil, lard oil, kerosene, etc., the coolants being of the type used in machine operations consisting of grinding, honing, threading, turning, boring, milling, etc.

It is the usual practice in using these coolants to direct a flow in a continuous circuit to and away from the active machining operations and to have this flow uninterrupted throughout the entire working day.

The art of machining, especially where exactness in finish and sizing operations are concerned, requires such coolants to be free from all grit, chips, fine iron, and any other foreign matter that might scratch or mar a finished surface. Therefore, the prime purpose or object of such coolants is to provide a lubricant for the tools and to keep the tools and the object being machined cool to thereby prevent distortion from heating, and prevent the machined parts from rusting.

The coolant in serving these useful purposes becomes contaminated with fine iron, scale, grit, sludge, non-magnetic grindings, etc. It is evident that if used in this contaminated condition damage to the parts being machined will follow, especially to those having ground or honed surfaces. The expense involved, which includes labor in preparing the mixture, the cost of the elements involved, and the large quantities used, makes it imperative that these coolants be used repeatedly, and that maximum recoveries be made by the most economical means possible. It is also of further importance that the separator remove from the liquid coolants both the magnetic and the non-magnetic solids, which in general machine shop practice are in the usual proportions of from 80 to 85 per cent fine iron and from 15 to 20 per cent non-magnetic material.

The extreme speed and high production methods employed in machine shop practice today requires the use of large quantities of such coolants. Consequently, it is increasingly important, from an economic standpoint, that they be clean and free from foreign matter, both magnetic and non-magnetic.

There are at present means used for cleaning such coolants which depend largely upon the human element, which generally result in poor or damaged machine parts, due to carelessness or neglect in keeping such devices clean and in working order.

Further objects are to provide a magnetic separator which is continuous in its operation, which removes both magnetic and non-magnetic material from the coolants, which is simple and highly efficient in operation and which requires no thought on the part of the operator.

The invention also contemplates either the use of the magnetic separator as a distinct and separate entity from the machines, whereby it may serve several machines, or as attached to any particular machine if desired.

A further and important object of this invention is to provide a magnetic separator which will handle a very large volume of coolants in a very short period of time and in a continuous and uninterrupted manner.

An embodiment of the invention is shown in the accompanying drawings, in which.

Figure 3:
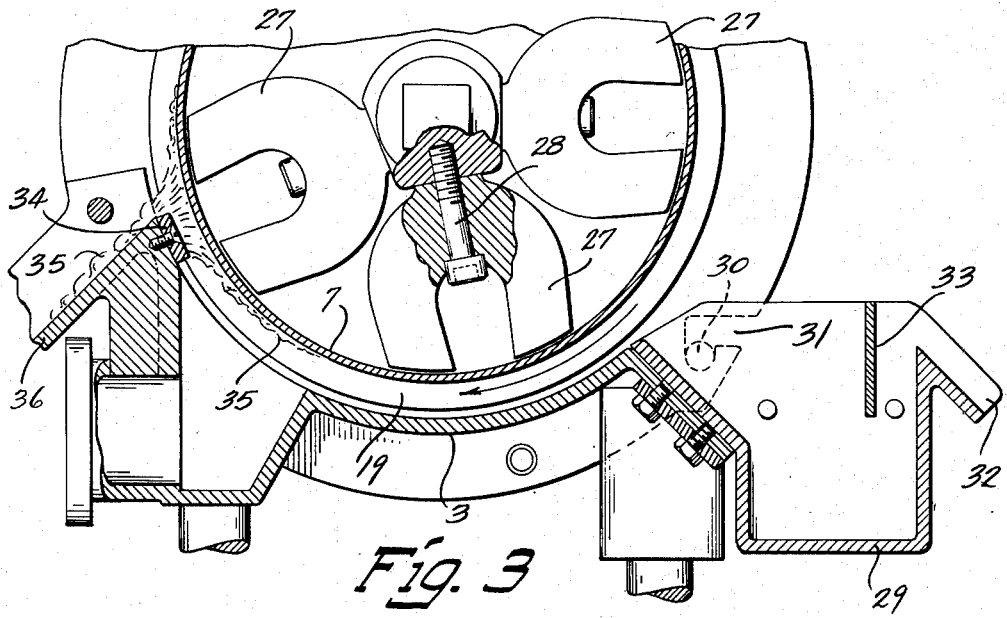
Figure 3 is a fragmentary sectional view at right angles to the axis of rotation of the cylinder.

Referring to the drawings, it will be seen that the separator comprises a pair of end plates 1 and 2 which are joined at their bottom by an annular member 3 which extends partway around the apparatus, as is clearly shown in Figure 3. These parts are preferably made of a non-magnetic alloy. A top plate 4 is carried by the end plates and supports the driving motor 5 and the gear mechanism 6.

Figure 2:
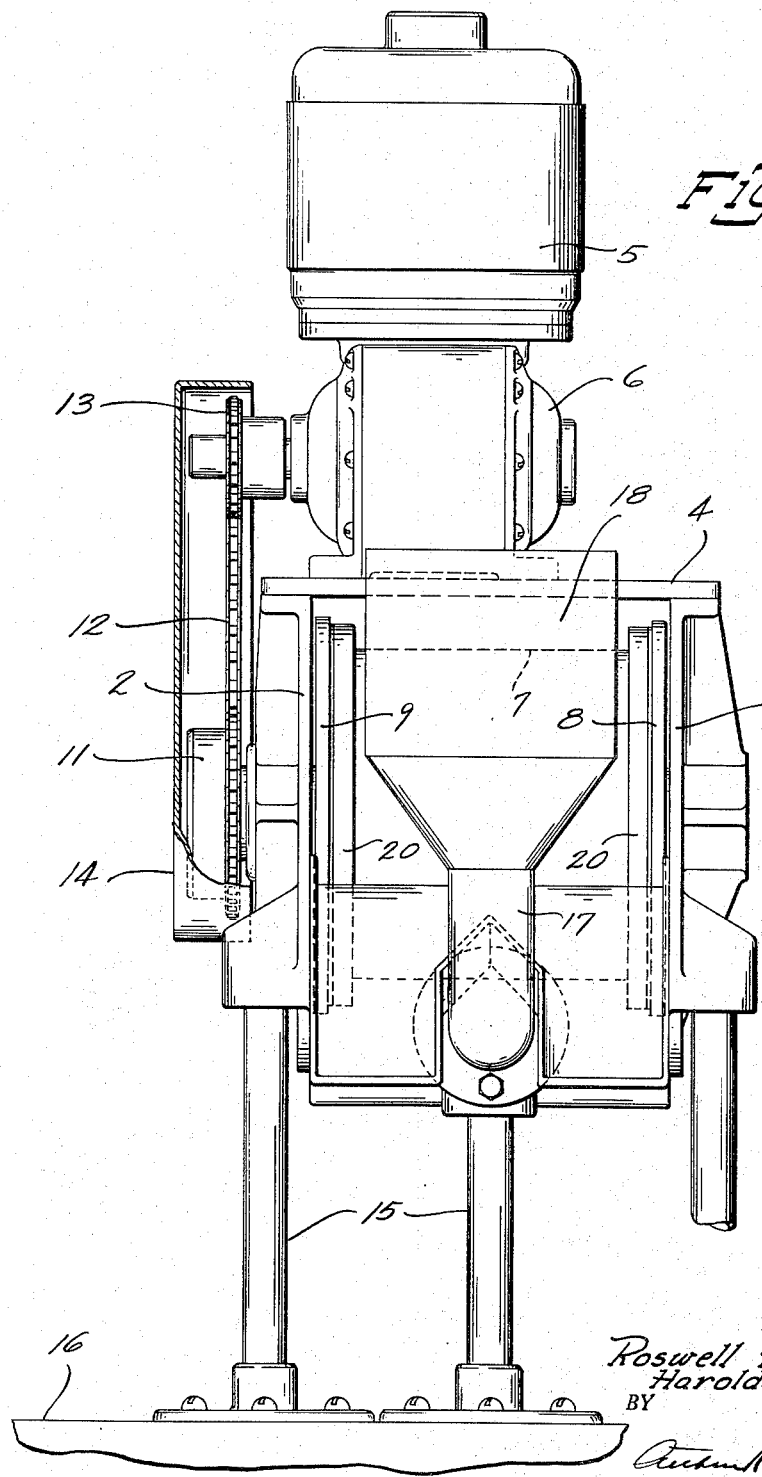
Figure 2 is a rear view of the apparatus with a part broken away and in section.

Within the outer casing a drum 7 of non-magnetic material is revolubly carried by a pair of rotary end plates 8 and 9. The end plate 9 has a projecting hub 10 which carries a sprocket wheel 11 which is connected by means of a chain 12 with the sprocket wheel 13 of the reduction gear 6, so that the drum is driven from the motor, suitable housing means 14 being provided over the sprocket wheels and chain, see Figure 2.

The entire device is supported in any suitable manner, for example, it may be supported by a plurality of uprights 15 from a suitable base 16.

It is to be distinctly understood that the device may be a separate entity, distinct and separate in itself, as shown in the drawings, or may be attached to a machine if desired. It is provided with an intake channel or channels, one of which has been shown and indicated by the reference character 17. The upper end of this channel may terminate at an upper hopper 18 adapted to receive the coolant and at a sufficient elevation to provide the necessary hydrostatic head to insure the rapid circulation of the coolant below the cylinder and above the annular member 3 of the casing.

Figure 4:
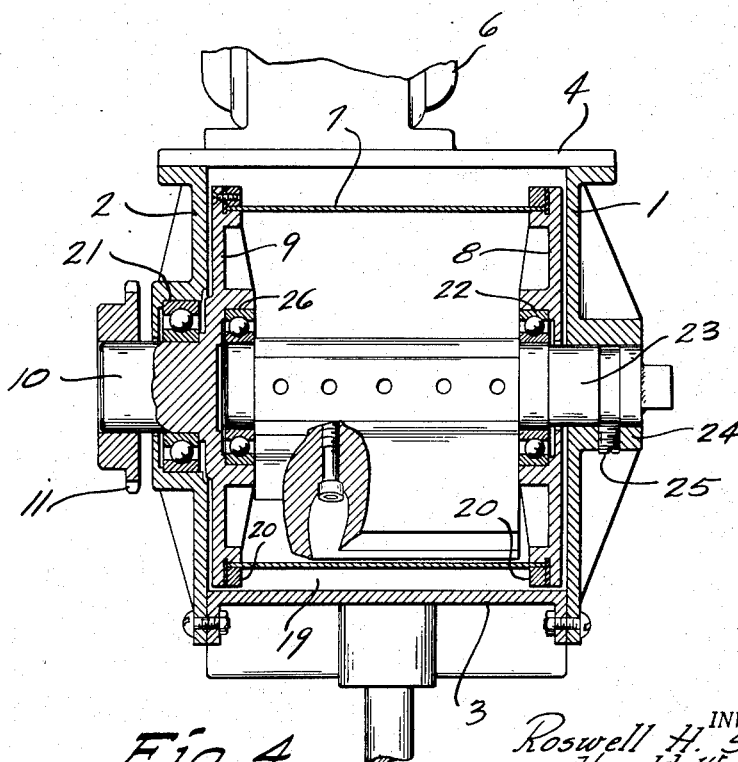
Figure 4 is a vertical sectional view at right angles to the section shown in Figure 3, such view also being fragmentary.

It is to be noted that the annular portion 3 of the casing and the drum 7 provide an annular passage indicated by the reference character 19, see Figures 3 and 4. It is preferable to provide non-magnetic end rings 20 at the ends of the drums which end rings are secured to the end plates 8 and 9 in any suitable manner, as indicated for instance in Figure 4. These end rings 20 may be welded to the drum 7.

It is to be noted that the rotary end plate 9 of the drum is journaled in the bearing indicated generally at 21 in the housing or casing adjacent the sprocket wheel 11. At the other end, the end plate 8 is carried by a bearing 22 and supported from a revolubly, adjustable stationary shaft 23. One end of the stationary shaft 23 is mounted within the extension 24 of the end plate 1 and is secured in any adjusted position by means of the set screw 25. The extreme end of the shaft may be squared to facilitate its adjustment. The other end of the shaft 23 is carried within a bearing 26 mounted within the end plate 9.

The shaft 23 carries a plurality of permanent magnets 27 which may be secured to flat faces on the shaft by any suitable means, as by means of the bolts or screws 28. The poles of these magnets are of alternate polarity and are arranged in close proximity to the inner surface of the non-magnetic drum 7.

It is to be noted further from an examination of Figure 3 that the outer or discharge end of the apparatus is provided with an overflow tank or removable basin 29 which may be provided with trunnions 30 removably hooked in slots 31 formed in the end plates. This basin 29 constitutes, in reality, a catch basin for the non-magnetic solids and is provided with an overflow 32 for the coolant. It has a baffle 33 that extends downwardly from adjacent its upper portion to a point below the intake of the outlet or overflow 32.

A high permeability magnetic bar 34 is secured to the casing as shown in Figure 3 on the side thereof opposite the liquid overflow. This side is, in reality, the discharge side for the magnetic material, which latter is indicated by the reference character 35. This magnetic material is picked up by the drum and as the drum rotates in a direction counter to the direction of flow of the liquid, it will be seen that the magnetic particles are removed from the flowing liquid and are carried towards the magnetic discharge end of the device. They cling to the outer surface of the drum and are subjected to the alternate polarity of the powerful permanent magnets 27. Obviously, the permanent magnets could be replaced by electromagnets if so desired, but the permanent magnets have been found eminently satisfactory and materially assist in the simplification of the separator.

The magnetic bar 34 concentrates the lines of flux from the last magnet 27 and causes the magnetic material to bunch or compact itself against the bar 34 and between the bar and the drum 7, so that it produces a powerful wringing or dewatering action on the magnetic material carried by the drum. This magnetic material is dragged through or forced against the highly compacted, clinging magnetic material at the bar 34 and substantially the last portion of the liquid is removed from the magnetic material. It is discharged through the magnetic material discharge chute 36. The highly compacted, clinging magnetic material at the bar 34 also constitutes a dam and prevents the discharge of liquid adjacent the bar but allows the magnetic material to be forced against and through the highly compacted mass of magnetic material. It is thus possible to have a sufficiently great hydrostatic head to produce a rapid travel of the liquid through the separator.

Figure 1:
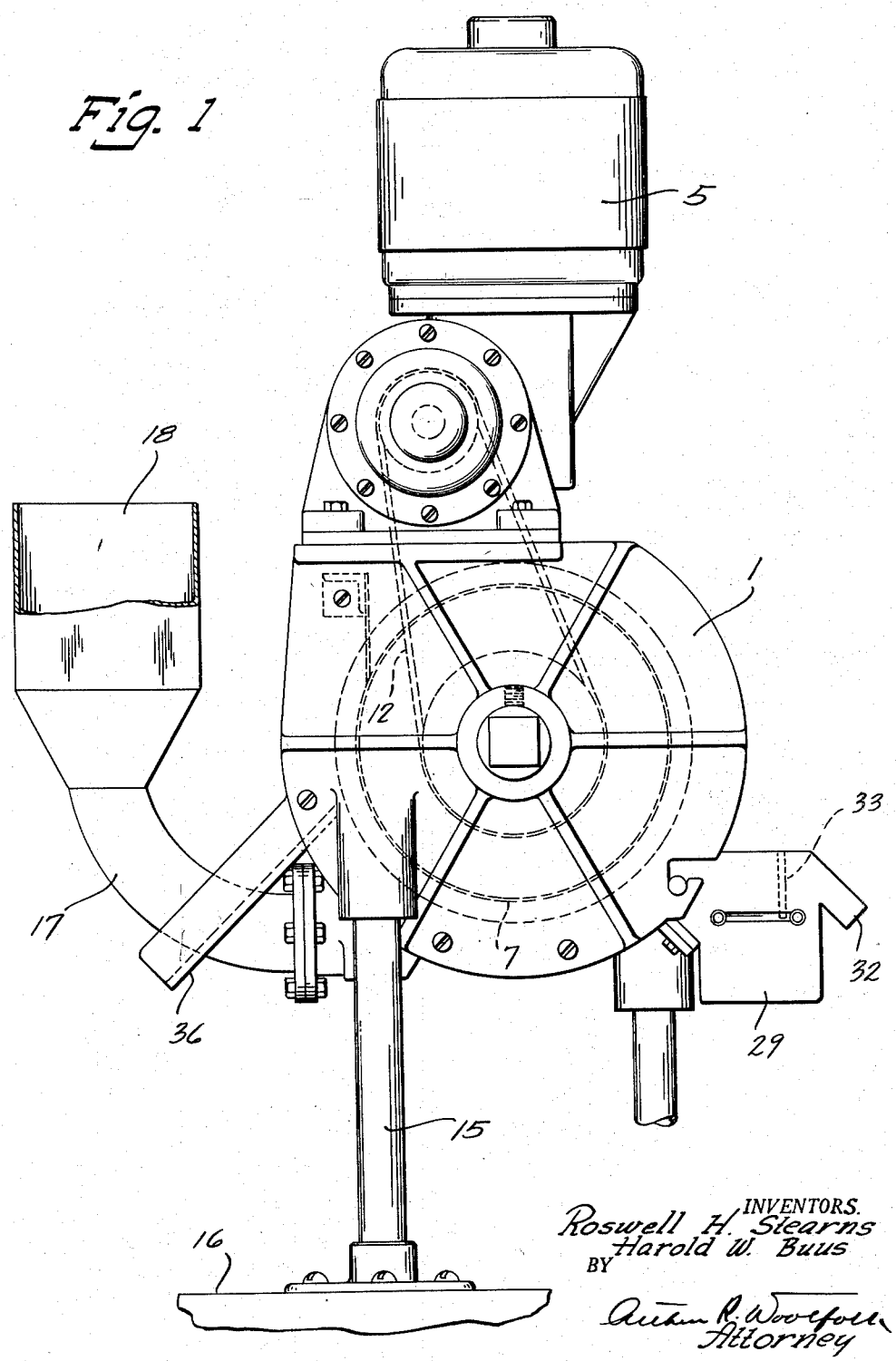
Figure 1 is a side elevation of the apparatus.

It is to be noted that the liquid flow through the annular channel of the separator is sufficiently rapid to carry the non-magnetic materials past the separator and into the settling chamber or collection chamber 29. This chamber may be emptied from time to time as desired. The speed at which the liquid travels through the separator is determined by the height of the head of liquid in the intake portion of the apparatus 17 and 18, see Figure 1.

As stated previously, it is within the province of this invention to secure the intake hoppers—one or more of which could be used if desired—to the separator though it is also within the province of this invention, as described hereinbefore, to attach the separator to any particular machine so that the coolant could flow directly from the machine to the separator.

It has been found that the separator is eminently suited for the purpose intended and that it will furnish a complete and rapid separation of the magnetic and non-magnetic material from the coolant and allow the coolant to be returned to the machine from which it was received in a pure and useable state without any magnetic or non-magnetic solid particles therein.

Although this invention has been described in considerable detail, it is to be understood that such description is intended as illustrative rather than limiting as the invention may be variously embodied and is to be interpreted as claimed.

We claim:

A magnetic separator for separating automatically and continuously three elements each distinctly different from the other, said elements consisting of a mixture of a liquid coolant and solids comprising magnetic and non-magnetic material, said separator comprising in combination a stationary segmental magnet structure of alternating polarity, a revoluble metal cylinder surrounding said magnetic structure, means for rotating said cylinder, a non-magnetic housing supporting said magnet structure and cylinder and having a liquid entrance located adjacent the side of the cylinder which travels upwardly upon rotation and a liquid discharge on the opposite side of said cylinder, said cylinder and housing having opposed surfaces constituting in combination a channel through which the coolant and non-magnetic material flow while the magnetic portion is being removed and carried by said cylinder to discharge in the opposite direction to the flow of said coolant and non-magnetic material adjacent and above the liquid entrance, means for supplying said mixture through said liquid entrance opening at a velocity sufficient to carry the non-magnetic material through said liquid discharge, a magnetizable bar carried by said housing and located above said liquid entrance and arranged to concentrate magnetic flux adjacent the point at which the magnetic material is discharged to thereby cause magnetic material to become compacted at said bar and simultaneously produce a dewatering action and the effect of a dam to prevent discharge of liquid adjacent said bar, and a baffled settling chamber for non-magnetic solids at the liquid discharge side of said housing.

References Cited in the file of this patent

UNITED STATES PATENTS

| Number | Name | Date |
|---|---|---|
| 2,160,628 | Steffensen | May 30, 1939 |
| 2,276,075 | Wuensch | Mar. 10, 1942 |
| 2,422,113 | Martin | June 10, 1947 |
| 2,466,839 | Caldwell | Apr. 12, 1949 |
| 2,597,561 | Blind | May 20, 1952 |